United States Patent [19]

McClain

[11] Patent Number: 4,820,803

[45] Date of Patent: Apr. 11, 1989

[54] PROCESS FOR RECOVERING ETHYLENE-VINYL ACETATE COPOLYMERS FROM AN AQUEOUS DISPERSION

[75] Inventor: Dorothee M. McClain, Cincinnati, Ohio

[73] Assignee: National Distillers and Chemical Corporation, New York, N.Y.

[21] Appl. No.: 802,891

[22] Filed: Nov. 29, 1985

[51] Int. Cl.$^4$ ................................................ C08F 6/00
[52] U.S. Cl. .................................. 528/487; 528/486; 528/488
[58] Field of Search ...................... 528/487, 488, 486

[56] References Cited

U.S. PATENT DOCUMENTS

| | | | |
|---|---|---|---|
| 3,517,083 | 6/1970 | Salyer | 525/222 |
| 3,968,091 | 7/1976 | Stiles et al. | 524/349 |
| 3,985,719 | 10/1976 | Hoyt et al. | 525/62 |
| 4,148,766 | 4/1979 | McClain | 524/417 |
| 4,150,003 | 4/1979 | McClain et al. | 524/417 |
| 4,151,134 | 4/1979 | McClain | 524/417 |
| 4,151,135 | 4/1979 | McClain | 524/417 |

Primary Examiner—Joseph L. Schofer
Assistant Examiner—J. M. Reddick
Attorney, Agent, or Firm—Kenneth D. Tremain

[57] ABSTRACT

The presence of a water-soluble substantially neutral salt significantly improves the recovery filtration of dispersions of ethylene-vinyl acetate polymers of 35 to 85 percent vinyl acetate content.

20 Claims, No Drawings

PROCESS FOR RECOVERING ETHYLENE-VINYL ACETATE COPOLYMERS FROM AN AQUEOUS DISPERSION

BACKGROUND OF THE INVENTION

1. Field of the Invention

This invention relates to the field of ethylene-vinyl acetate copolymers and partially hydrolyzed ethylene-vinyl acetate copolymers. This invention more particularly relates to a process for comminuting these copolymers and converting them into dry powder compositions. The invention especially relates to improvements in the recovery of these dry powders whereby the filtration is improved and a filter cake of higher solids content is obtained.

2. Description of the Prior Art

High pressure ethylene-vinyl acetate (EVA) copolymers are a well-known class of thermoplastic resins. Copolymers containing up to about 60 weight percent of vinyl acetate are now available commercially via a modified high pressure polyethylene process operating at 1000–2000 atmospheres, and compositions containing as much as 85 weight percent vinyl acetate have been made experimentally by the high pressure process. EVA resins containing up to about 35 weight percent of vinyl acetate are readily handled in the form of pellets, yet even resins with a vinyl acetate content in the upper part of this range tend to stick together under the pressure of their own weight, especially under hot storage conditions. Copolymers containing between about 35 and about 60 weight percent of vinyl acetate can also be pelletized, but the pellets tend to be tacky and coalesce increasingly at higher vinyl acetate contents in this range. At about 40 to 45 weight percent vinyl acetate, the pellets maintain their identity, but often partially fuse into bulky masses resembling bunches of grapes. At 50 to 60 weight percent vinyl acetate content, the pellets lose their identity and these resins normally assume the shape of their container by cold flow and consequently are only available as solid blocks. Copolymers containing 35 to 85 weight percent vinyl acetate can be produced with melt flow rates below 5 (Condition B, ASTM D1238) and, in most cases, as low as 0.2 when finished by thermal treatment by known methods, e.g. U.S. Pat. No. 3,968,091.

U.S. Pat. No. 3,517,083 discloses that EVA resins containing 15 to 60 weight percent vinyl acetate may be used as impact modifiers in rigid polyvinyl chloride (PVC) formulations, and that EVA copolymers containing 60 to 85 weight percent vinyl acetate are useful in producing flexible blends with PVC. However, a serious impediment in blending high pressure EVA into PVC is the aforesaid physical form of the EVA resins. To blend even EVA pellets into PVC, which is normally supplied as a powder, requires the expenditure of considerable energy and introduces an undesirable heat history into the PVC (e.g. see Plastics Engineering, April 1967, p. 47; Plastics Technology, July 1975, p. 50). Blending of the fused pellets characteristic of the EVA resins containing above about 50 weight percent vinyl acetate would obviously be still more difficult than blending free pellets.

Accordingly, to facilitate the blending of high pressure EVA copolymers into PVC powder and into other pulverulent polymers as well, it would be highly desirable to have the EVA copolymers in powder form. Dry blending of PVC powder and the EVA powder could then be readily accomplished at little expenditure of energy and without imparting an undesirable heat history to the heat-sensitive PVC due to the blending operation itself. Recently, processes have been developed to prepare tacky EVA copolymers containing from 35 up to about 85 weight percent vinyl acetate, in particular those made by the high pressure process, as dry powders, in the laboratory, but filtration problems hindered developed of a commercial use of this process.

Hydrolyzed ethylene-vinyl acetate (HEVA) copolymers, particularly the so-called partially hydrolyzed copolymers, herein defined as EVA resins, originally contain about 35 to about 85 weight percent of vinyl acetate have been known for many years. They resemble the high pressure EVA resins in being inherently tacky materials but present certain advantages by virtue of their hydroxyl functionality, e.g. enchanced adhesion to various substrates, additional cross-linkability, and have superior heat and mill stability as compared to EVA. In addition, those less than 50 percent hydrolyzed also function as impact modifiers in rigid PVC formulations, whereas the substantially fully hydrolyzed EVA resins do not.

Several patents of the assignee herein relate to the formation of dispersions of olefinic polymers and copolymers, particularly ethylene-vinyl acetate copolymers. U.S. Pat. No. 4,148,766 discloses dispersing ethylene-vinyl acetate copolymers in an aqueous system containing an alkali metal soap, such as sodium stearate, and a neutral salt such as an alkali metal salt, viz., sodium chloride or sodium sulfate. The soap may be formed in situ or a preformed soap may be used. The dispersed copolymer may be recovered by filtration, washed with water and dried. The vinyl acetate content of the EVA copolymers disclosed in this patent is limited to 15 weight percent maximum.

U.S. Pat. No. 4,150,003 relates to forming dispersions of ethylene-vinyl acetate copolymers which contain from 35 to 85 weight percent vinyl acetate. The dispersing agent employed is an alkali metal salt of a higher carboxylic acid. The use of a neutral salt, such as sodium chloride, in the dispersion mixture is said to enhance the dispersion process. The addition of an alkaline earth metal hydroxide is employed to form an inorganic soap which acts as a parting compound for the dispersed particles.

U.S. Pat. No. 4,151,134 discloses the simultaneous dispersion and saponification of ethylene-vinyl acetate copolymers by employing soap dispersions in a saponification medium comprising a strong base. The soap may be one such as sodium stearate and the saponification agent is an alkali metal hydroxide such as sodium hydroxide. A water soluble, substantially neutral salt, such as sodium chloride, may optionally be incorporated into the dispersion system to decrease the hydrolyzed EVA (HEVA) copolymer particle size and to promote particle sphericity.

U.S Pat. No. 4,151,135 discloses a process for dispersing and recovering, as dry powders, tacky EVA copolymers and tacky partially hydrolyzed HEVA copolymers. The copolymers are dispersed in water by means of the incorporation of an alkaline metal soap, such as sodium stearate, in the aqueous dispersion mixture. The sodium stearate is then converted to calcium stearate by the addition of calcium hydroxide to provide the insoluble alkaline earth metal soap which acts as a parting compound for the dispersed particles. The dispersion mixture may also include a neutral salt, such as sodium chloride, as well as a saponification agent such as sodium hydroxide.

Although the use of a neutral salt, such as sodium chloride, is an essential part of the process in the '766 patent where the vinyl acetate content of the copolymers is limited to 0-15 weight percent, the use of a neutral salt is said to be optional when preparing dispersions of EVA copolymers where the vinyl acetate content is greater than 15 weight percent in accordance with the process of the '003, the '134 and the '135 patents.

However, during pilot plant scale up of the process of the '135 patent, the filter cakes recovered contained only 25 to 30 weight percent solids and the filtration rate proved to be extremely slow. Futhermore, the low solids filter cakes where found to be difficult to dry, requiring as many as three passes through a flash dryer.

The purpose of the presence of neutral salts in the process of the '766 patent is to make the alkali metal soap more effective in dispersing polymers of low polarity such as the polyethylene and the EVA's of low acetate content. In the case of the EVA polymers of higher vinyl acetate content which are more polar and the subject of the '003, the '134 and the '135 patents, the presence of the neutral salt is optional since the alkali metal soap itself is sufficient to disperse the polymer to the desired particle size. In fact, the presence of a neutral salt with the polar EVA polymers of a high VA content will produce such a fine particle size that recovery by conventional practices employed commercially becomes difficult, if not impossible. In such instances the discharging dispersion latex coagulates immediately to big lumps. In contradiction to this, because of their lipophilic nature, dispersions of polyethylene or EVA's with low to medium vinyl acetate content do not require any filtration aids. These latter polymers do, however, require a neutral salt to effect the desired dispersion but the EVA polymers with high VA content do not require a neutral salt to disperse them because of their polar nature.

It is an object of this invention to provide EVA copolymers having a VA content above about 25 weight percent in a dry powder form.

It is a further object of this invention to provide polar EVA copolymers in a powder form by a process where the recovery of the EVA copolymers is effected by a filtration process which provides filter cakes having a high solids content thereby minimizing the energy required to dry these filter cakes.

SUMMARY OF THE INVENTION

These and other objects of this invention are achieved by adding a substantially neutral salt to the dispersion subsequent to the formation of the polymer dispersion and prior to the recovery step. Briefly, this invention is an improvement of the process of U.S. Pat. No. 4,151,135, the entire contents of which are incorporated herein by reference.

In particular, this invention relates to an improvement in a process for improving the parting characteristics of particulate ethylene-vinyl acetate polymers comprising from about 25 percent to about 85 percent vinyl acetate units and corresponding hydrolyzed ethylene-vinyl acetate polymers which comprises agitating in molten state said polymer in an aqueous dispersion system comprising an alkaline metal soap and cooling the resultant dispersion to obtain said polymer as finely divided particles; converting said soap in situ to the corresponding carboxylic acid or to the corresponding alkaline earth metal soap to coat said particles and recovering said particles by filtration and drying, said improvement comprising adding, subsequent to the formation of the polymer dispersion and prior to the filtration, an amount of a water-soluble, substantially neutral salt inert to said soap effective to substantially reduce the filtration time, substantially increase the solids content of the filter cake and substantially reduce the drying time of the filter cake as would be obtained in the absence of said neutral salt.

This invention also relates to an improvement in a process for improving the parting characteristics of particulate saponified ethylene-vinyl acetate polymers which comprises agitating in molten state ethylene-vinyl acetate polymers comprising from about 25 percent to about 85 percent vinyl acetate units in an aqueous dispersion system comprising an alkali metal soap together with an alkali metal hydroxide in an amount sufficient to saponify said polymer to a predetermined degree, cooling the resulting dispersion to obtain said polymer as finely divided particles, converting said soap in situ to the corresponding carboxylic acid or to the corresponding alkaline earth metal soap to coat said particles, and recovering said particles by filtration and drying, the said improvement comprising adding, subsequent to the formation of the dispersion of polymer and prior to the filtration, an amount of a water-soluble substantially neutral salt inert to said soap effective to substantially reduce the filtration time, substantially increase the solids content of the filter cake, and substantially reduce the drying time of the filter cake as would be obtained in the absence of said metal salt.

This invention also relates to the particulate polymer prepared by either of the above described processes.

DESCRIPTION OF THE PREFERRED EMBODIMENTS

The present invention relates to improvements in the process of preparing ethylene-vinyl acetate (EVA) polymers in particulate form and, in particular, to improvements in the recovery portion of the process wherein the polymer particles are recovered by filtration from the aqueous medium in which they were formed and are then dried to provide the desired product.

The filtration, as practiced in the prior art process of U.S. Pat. No. 4,151,135, is often undesirably slow because of blinding of the filter cloth with ultrafine material and the solids content of the filter cake is about 25 to 30 percent. Further, several passes, often as many as three passes, through a flash dryer are required to provide powdered EVA polymer particles with a moisture level of 0.5 percent. By practicing the improvements of the present invention, the filtration is rapid, the solids content of the filter cake reaches 50 to 60 percent, and a single pass through a flash dryer will provide a 0.5 percent moisture content EVA particle.

Although the EVA and HEVA copolymers employed in the practice of this invention can be prepared by any suitable polymerization process, for example, by way of solution and dispersion or emulsion polymerization techniques, they are advantageously prepared by the much faster high pressure bulk polymerization process in current use.

The EVA copolymers herein contain from about 15 to about 75 percent by weight of combined ethylene, the balance of the polymer being made up of combined vinyl acetate. The copolymers can also contain up to about 20 percent by weight of a combined third comonomer polymerizable with ethylene and vinyl acetate. Illustrative termonomers are methyl acrylate, methyl methacrylate, ethyl acrylate, ethyl methacrylate, proply acrylate, propyl methacrylate, butyl acrylate, butyl methacrylate, dimethyl itaconate, diethyl itaconate, dimethyl-2-methylene glutarate, diethyl-2-methylene glutarate, dimethyl daleate, diethyl fumarate, dibutyl fumarate, and the like. When a third conomoner is present in the polymer, the vinyl acetate content of the balance of the polymer will vary from 25 to 85 percent of the said balance, the remainder being ethylene.

The melt flow rate of the EVA copolymers can range from less that about 0.1 to up to about 100 or even higher. (Condition B, ASTM D1238-73). The preferred copolymers are those with a MFR of less than about 40, more preferred are those of less than about 25, and most preferred are the copolymers of less than about 10 MFR.

According to the present process, EVA copolymer is agitated in the molten state in an aqueous dispersion system comprising an alkali metal soap of a higher carboxylic acid, optionally with a water soluble, substantially neutral salt inert to the soap, and the dispersion system with the copolymer in the dispersed state is cooled to below about 100° C. Thereafter, the dispersion may be converted to a dry powder by any of several alternative procedures such as conversion of the soap into a less soluble form, as by acidification, to release the corresponding higher carboxylic acid, or reaction with a source of alkaline earth metal, e.g. salt to produce an insoluble soap (Ca, Ba, Sr, Mg soap, etc.), thereby providing a parting agent for the dispersed tacky polymer particles.

Before the particles are separated, as by filtration, the improvement which is the subject of this invention is practiced. A quantity of a water-soluble substantially neutral salt is added to the aqueous medium containing the particles of EVA polymer. The presence of this salt significantly improves the subsequent filtration which is employed to recover the treated tacky resin particles from the dispersion medium. Specifically, these improvements are more rapid filtering, a filter cake of resin having a higher solids content and a shorter drying period to provide the EVA polymer particles.

The freshly recovered resin particles are thereafter preferably washed with cold water, advantageously deionized or distilled, to remove contained water-soluble compounds and the washings are combined with the mother liquor. These washings contain very little, if any, soap or higher carboxylic acid. The acid employed for acidification is desirably selected to match the anion of the aforesaid water-soluble, substantially neutral salt, e.g., hydrochloric acid for sodium chloride. When the source of alkaline earth metal ions, e.g., calcium hydroxide is added to convert the higher carboxylic acid soap to an insoluble soap, e.g., calcium soap, for a parting agent, the mother liquor will contain alkali metal hydroxide which can be recycled, for example, to make additional in situ soap or simply neutralized to provide additional water-soluble salt. Normally a substantial proportion of the water is then removed by distillation and the residue, containing substantially all of the water-soluble salt and alkali (if any) can be recycled.

In each of the aforedescribed processes, the soap component of the dispersant system can be a preformed soap or, alternatively, the soap can be produced in situ, e.g., by saponifying a fatty acid glyceride or other fatty acid ester and/or by esterifying a fatty acid.

Each of the components may be introduced independently and separately in these processes but it is also possible to combine two or more of the components before introduction into the dispersion vessel. Where in situ soaps are employed, the base introduced to neutralize the higher carboxylic acid may also be added in aqueous solution. The EVA copolymer itself may also be employed as a medium for introducing the other components. Thus, for example, where an in situ soap is desired, it is convenient to blend the higher carboxylic acid into the copolymer before introduction into the dispersion, and, where a preformed soap is employed, this, too, can be blended into the polymer prior to dispersion.

The preferred soaps are soaps of alkali metals of atomic weight of at least 23 i.e. sodium, potassium, rudibium and cesium, and, of these, the more preferred are sodium and potassium because of their availability or ease of preparation, the most preferred being sodium which is most economical and practical.

The alkali metal soaps for use in the foregoing dispersion processes are known compounds, i.e. salts of higher carboxylic acids with the alkali metals.

The higher carboxylic acid moiety of the soap is normally a monobasic acid, although certain dibasic acids are effective. The acid moiety may be linear or branched. It may be saturated or unsaturated, usually ethylenically unsaturated. Most commonly, however, the higher carboxylic acid moiety is a fatty moiety, and it can be composed of a mixture of such acids, for example as is obtained by saponification of natural glyceride fats. The term "higher carboxylic acid" as used in this invention includes the so-called dimer acids made by dimerization of polyunsaturated linear fatty acids. Also included in the term "higher carboxylic acid" are rosin or abietic acids. The soap should not react adversely to any appreciable extent with the polymer substrates, i.e., it should be substantially inert to the polymer. As employed therein, and in the appended clauses, the term "soap" embraces the aforesaid salts of higher carboxylic acids.

The preferred higher carboxylic acid is a straight-chain $C_8$-$C_{22}$ monocarboxylic acid, which can be saturated or can contain one or more carbon-carbon double bonds per molecule, and can contain an even or odd number of carbon atoms. Examples are caprylic acid, pelargonic acid, capric acid, undecanoic acid, lauric acid, tridecanoic acid, myristic acid, pentadecanoic acid, palmitic acid, margaric acid, stearic acid, nonadecanoic acid, arachidic (arachic) acid, heneicosanoic acid, behenic acid, 10-undecylenic acid, elaidic acid, oleic acid, erucic acid, brassidic acid, linoleic acid, and linolenic acid as well as mixtures of such acids, and dimeric acids made by the dimerization of polyunsaturated fatty acids, e.g., linolenic acid. Dimeric acids are commercially available and contain 75 to 95 percent dimer, 4 to 25 percent trimer, and from a trace to 3 percent of monomeric polyunsaturated fatty acid. Rosin or abietic-type acids useful in this invention are hydrogenated rosin, dehydrogenated rosin, and polymerized rosin, all of which are available commercially, e.g., from Hercules, Inc. under the trade name of Resin 731D and Polypale, respectively.

Where a preformed soap is introduced, it will be a soap prepared by neutralization of one of the above disclosed acids or mixtures, with one or mixtures of the bases disclosed below or alternatively, commercially available fatty acid salts can be used.

When an in situ soap is employed, the soap is formed by reacting the higher carboxylic acid with an alkali metal hydroxide. Alternatively, the corresponding bialkali metal hydroxides that can be used are sodium hydroxide, potassium hydroxide, lithium hydroxide, rubidium hydroxide and cesium hydroxide; sodium bicarbonate and sodium carbonate; potassium bicarbonate and potassium carbonate; rubidium bicarbonate and rubidium carbonate; and cesium bicarbonate and carbonate may be substituted for the corresponding hydroxides. Mixtures of the said alkali metal compounds can be employed.

The water-soluble salt is a substantially neutral salt. For the purposes of this invention, such a salt is defined as one that, at a concentration of 1.0 molar in pure water at 20° C., produces a solution whose pH lies between 4 and 9. The cation of the salt is derived from an alkali metal or any other metal that does not form insoluble soaps with the above-disclosed higher carboxylic acids at the operating temperature of the process i.e., is inert to the soap employed. The cation may be monovalent, divalent or higher valence. The nature of the anion of the salt does not appear to be critical; the anion can be for example, fluoride, chloride, bromide, iodide, bisulfate, sulfate, hydrogen phosphate, dihydrogen phosphate, nitrate, bicarbonate, acetate or propionate anion, or similar such anions. Mixtures of salts can be employed.

Specific examples of the water-soluble salts are lithium fluoride, lithium chloride, sodium chloride, sodium bisulfate, sodium sulfate, sodium hydrogen phosphate, ammonium chloride, potassium dihydrogen phosphate, sodium acetate, sodium propionate, etc. with sodium chloride and sodium sulfate being preferred. The cation of the soap and the water-soluble salt may be the same or different.

It is usually preferred that the ratio of polymer to water range from about 0.1 to about 3 parts of polymer per part of water on a weight basis. Lower ratios are operable, but uneconomical, whereas higher ratios, though usable, present operational difficulties. The most preferred range is about 0.2 to about 0.5 parts of polymer per part of water on a weight basis. For in situ soap formation, equivalent amounts of base are added to the fatty acid, the preferred ratio being from about 1.05 to about 1.1. Higher ratios are of no advantage unless saponification of the polymer is desired. The weight ratio of fatty acid soap to polymer may vary from about 0.01 to about 0.30, the preferred ratio being from about 0.03 to about 0.12. The use of lower ratios of soap does not always result in the desired dispersion of the copolymer; high ratios are generally unnecessary and therefore uneconomical. The preferred higher carboxylic acid soap is a fatty acid soap, the most preferred fatty acid soap being sodium stearate.

The water-soluble neutral salt must be present is this dispersion medium after the EVA polymer is formed into particles, but before the particles are recovered by filtration. Advantageously, the salt can be added when the addition is made to convert the alkali metal soap to the corresponding insoluble alkaline earth metal soap or acid. Although neutral salts have been employed in the prior art dispersion process to make the alkali metal soap more effective in achieving the desired particle size when dispersing polymers of low polarity, such as polyethylene, and EVA containing less than 15 percent vinyl acetate, the use of these salts has been said to be optional when dispersing the more polar EVA's of 25 percent and greater vinyl acetate content. In fact, the presence of a neutral salt, such as sodium chloride or sodium sulfate, when dispensing the more polar EVA's produces such a fine particle size that recovery by conventional filtration becomes impossible since the fine particles plug the filter cloth. Thus, the use of a neutral salt when dispersing the polar EVA's is not only optional but is undesirable where filtration forms part of the recovery process. It was completely unexpected to find that the presence of a neutral salt in the aqueous dispersion medium prior to filtration would cause such dramatic improvements in the filtration step of the recovery process.

Dispersions of polyethylene and low polarity EVA's do not require filtration aids due to their lipohilic nature but they do require a neutral salt to achieve the proper degree of dispersion. The opposite is true for the polar EVA polymers. No neutral salt is needed to disperse these polymers and, in fact, the presence of the neutral salt is counterproductive at this stage in the overall process. However, filtration of the dispersions of the more polar EVA polymers is not easy and is vastly improved when neutral salts are present during the filtration.

The quantity of neutral salt added before filtration must be effective to substantially reduce the filtration time, substantially increase the solids content of the filter cake and substantially reduce the drying time of the filter cakes as compared to filtration and drying conducted in the absence of said neutral salt. More particularly, the concentration of neutral salt, based on total water, should be greater than 3 percent, more particularly in the range of about 3 to about 10 percent, especially in the range of about 3 to about 5 percent.

The dispersion temperature may range from about 100° to about 270° C., but temperatures of from about 130° to about 250° C. are preferred. Dispersions are usually not readily obtainable at lower temperatures and higher temperatures are usually not required for successful dispersion. The pressure is autogenous. The rate of stirring should vary from about 2600 to about 4000 rpm with from about 3200 to about 3800 rpm being preferred, although stirring rates that are lower are at times sufficient. Higher stirring rates may be employed but usually are not advantageous. The dispersion times range from about 1 minute to about 1 hour; times of about 5 to about 15 minutes are preferred.

The dispersions of EVA or HEVA copolymer substrate preferred for use in the present invention are generally composed of particles, usually spherical, of an average diameter ranging from about 20 microns up to about 500 microns, with the majority (80 to 90 percent) of particles being less than 250 microns. With the preferred dispersing systems, a substantial majority of particles are less than about 150 microns, usually ranging from about 20 to about 150 microns with most of the particles being in the range of about 50 to about 100 microns. As should be expected, the efficiency of these dispersion processes and the particle size of the dispersed products will vary to a certain extent with the selected soap, the temperature, the amounts of reagents employed and other factors with which those skilled in the art are familiar.

The HEVA copolymers which are useful in the practice of this invention may be prepared by any one of several known and convention hydrolysis processes, for example, by alcoholysis of EVA in a solution of a hydrocarbon and an alcohol (U.S. Pat. No. 3,985,719). Partially hydrolyzed EVA copolymers are normally elastomeric and more or less tacky at room temperature.

For reasons of efficiency and convenience, however, it is preferred to conduct the hydrolysis by saponification during the comminution-dispersion process itself, by adding a sufficient amount of a strong inorganic base to saponify the desired amount of combined vinyl acetate. The saponification-dispersion process is described in detail in U.S. Pat. No. 4,151,134, incorporated herein by reference. The same strong bases recited above in connection with the prepartion of alkali metal fatty acid soaps can be used as saponification agents, with sodium hydroxide and potassium hydroxide being preferred.

The choice of coating techniques will to some extent be determined by the procedure used for preparing the particulate EVA and HEVA copolymer particles. When an EVA copolymer dispersion is prepared according to the preferred process described above, the dispersion will contain an alkali metal salt of a higher carboxylic acid.

In the preferred embodiment of this invention, an alkaline earth metal compound such as magnesium hydroxide, calcium hydroxide, strontium hydroxide, barium hydroxide, or a corresponding oxide, bicarbonate, carbonate, halide, and the like is added to the cooled dispersion of EVA and HEVA copolymer to convert the alkali metal soap, employed as dispersing agent, into an insoluble alkaline earth metal soap. The insoluble alkaline earth metal soap will then coat the copolymer particles, the amount deposited being regulated by the amount of alkali metal soap employed to dispense the copolymer, with an alkaline earth metal compound being added in stoichiometric amount or in slight excess. Calcium hydroxide is the preferred alkaline earth metal compound and may be added as an aqueous solution, as an aqueous dispersion, or in the solid form, conveniently as a powder. The methathetical reaction is very rapid and complete. When the alkaline earth metal salt is a hydroxide, an oxide or a carbonate is produced as a by-product that can be recovered and reacted with more higher carboxylic acid to produce additional alkali metal soap for subsequent dispersions. The individual EVA and HEVA copolymer particles will be coated over substantially the entire outermost surfaces thereof with insoluble alkaline earth soap thereby providing the copolymer particles with greatly improved parting characteristics. Such powders, which are easy to recover by filtration will withstand drying at elevated temperatures, and will have sufficient compaction resistance when bags of powder are stacked under hot storage conditions.

The amount of alkaline earth metal soap required will be dictated by the amount necessary to impart the desired compaction resistance to the final dry powder. The amount of alkali metal soap used in the dispersion process can be adjusted to provide for the desired amount of alkaline earth metal soap parting agent. If desired, supplemental preformed alkaline earth metal soap of a higher carboxylic acid may be added to provide additional compaction resistance.

Parting agent fines do not present a problem, as they do when an alkaline earth metal soap is subsequently added as a parting agent to copolymer particles dispersed with Pluronic dispersants. Perhaps a portion of alkali metal soap used as a dispersant is anchored firmly to the particle surfaces, perhaps by solubility of the long hydrocarbon part of the soap molecules in the particle, leaving the ionic end of the molecule at the water-particle interface. When reaction with calcium hydroxide occurs, the calcium ion by virtue of its divalent nature, can serve as a bridging moiety between an aforesaid higher carboxylic acid soap anion anchored in the outermost particle layer and another higher carboxylic acid soap anion dissolved or dispered in the aqueous medium. Additionally, it is possible that the ionic character of the alkaline earth soap parting agent thus anchored to the particle surface, can by coulombic forces, serve to attract and bind additional molecules of alkaline earth soap molecules to the particle. However, applicant does not wish to be bound by this theoretical explanation of this invention.

It is obvious, of course, that there is no need to separate and recycle any of the alkali metal soap used as dispersing agent, nor is it advantageous to do so. Substantially all of it is converted to alkaline earth metal soap parting agent.

When the powder is employed as a dry-blendable impact modifier in rigid PVC, the alkaline earth metal soap finally serves as an external lubricant in the formulation. The great versatility of this embodiment of the invention is apparent from the fact that the same given amount of higher carboxylic acid serves the three main functions: (a) as the alkali metal soap it comminutes tacky EVA copolymers from the pellet or block form into the fine particle form by dispersion in water; (b) on conversion to the alkaline earth soap, it provides parting action to permit isolation and handling of the dispersed particles as a compaction-resistant dry powder; and (c) also in the alkaline earth soap form it can perform various functions in subsequent formulations, e.g., as a lubricant in rigid PVC formulations.

The preferred EVA copolymer dispersion system for use in this coating operation contains sodium or potassium stearate and the preferred alkaline earth metal compound is calcium hydroxide.

Thus, the preferred parting agent according to this invention is calcium stearate.

In a further embodiment of the invention, an acid, for example, acetic acid, hydrochloric acid or sulfuric acid is added to the cooled dispersion of the EVA copolymer to convert the alkali metal higher carboxylic acid soap therein to the corresponding water-insoluble higher carboxylic acid. The higher carboxylic acid will, in this manner, coat the copolymer particles. The protective action of the higher carboxylic acid is normally sufficient to permit recovery the powder without any danger of coalescing the particles. Filtration is rapid, and the powder can be dried under mild conditions but will not, in general, have sufficient compaction resistance for storage at elevated temperatures. It is advantageous to add a supplemental amount of preformed or in situ alkaline earth metal soap to achieve greater compaction resistance. The addition may be made directly to the acidified dispersion, or it may be blended into the wet filter cake, or added to the dry, higher carboxylic acid-coated particles. The parting agent may advantageously be added as a paste with, for example, a small amount of an alcohol, such as methanol, ethanol, propanol, etc.

In another embodiment, EVA particles coated as described above with a higher carboxylic acid released by acidification of the dispersion are thereafter treated as described above for the preferred embodiment of this invention with an alkaline earth metal compound such as magnesium hydroxide, calcium hydroxide, strontium hydroxide, barium hydroxide, or the corresponding oxides, bicarbonates, carbonates and the like, to convert the higher carboxylic acid coating on the particles to the corresponding alkaline earth metal soap. Calcium hydroxide is the preferred alkaline metal compound.

Acceptable results can be obtained by coating the EVA and HEVA particles with from about 1 percent to about 30 percent by weight of alkaline earth metal fatty acid soap, and preferably from about 3 percent to about 18 percent of this parting agent.

The polymers of this invention were characterized by means of their vinyl acetate content and reported as weight-percent vinyl acetate, abbreviated "wt. % VA".

The relative amounts of the ingredients in mixtures and composition described herein are often reported in terms of "parts per hundred parts resin" on a weight basis, abbreviated "phr" or "pph." In other instances, the ingredients may be expressed as weight percentage of total water present.

Although the following examples are particularly referenced to EVA copolymer particles, similar results can be obtained with HEVA copolymer particles employing the same procedures.

EXAMPLE 1

By way of demonstrating the improvements in filtration of EVA dispersions, several experiments were carried out with and without sodium chloride being present.

A simulated dispersion of 30% ethylene-vinyl acetate copolymer in water was prepared by stirring, in a blender, 120.2 grams of EY-901 (EVA) powder with 400 ml water. EY-901 is an ethyl-vinyl acetate copolymer which nominally contains about 38.5 to 42.4 weight percent vinyl acetate and has an MFR of 0.5 to 1.5.

The effect of Pluronic L-121, a nonionic surfactant, and ethanol on the filtration of the slurry was determined in a series of experiments, Experiments A-E.

Another simulated dispersion containing 10% EY-901 (EVA) powder and 9% Pluronic F-98, a nonionic surfactant, in water was prepared to resemble a typical let-down slurry. The advantage of using NaCl in such filtration was evaluated in a series of experiments, Experiments F-I.

In each experiment, 200 grams of slurry were vacuum filtered on Whatman 541 paper at 22 in. Hg on a Buchner funnel with an inside diameter of 6 ⅜ inches. The solids content of the filter cakes after five minutes of filtration was determined by fusion. The results are presented in Table I below.

TABLE 1

| Experiment No. | Additive | Filter Cake Solids Content % |
|---|---|---|
| A | Control | 36.0 |
| B | 0.1% Pluronic L-121[1] | 35.3 |
| C | 0.1% Pluronic L-121 added with mixing in blender | 35.1 |
| D | 2% ethanol | 35.2 |
| E | 0.2% Pluronic L-121 | 35.4 |
| F | 10% Slurry with 9% Pluronic F-98[1] | 25.6[2] |
| G | 1.8 g NaCl (2 pph on $H_2O$) | 38.1 |
| H | 9.0 g NaCl (5 pph on $H_2O$) | 50.3 |

TABLE 1-continued

| Experiment No. | Additive | Filter Cake Solids Content % |
|---|---|---|
| I | 18.0 g NaCl (10 pph on $H_2O$) | 58.3 |

Notes
[1] Nonionic surfactant of ethylene oxide and propylene oxide.
[2] Severe blinding of filter.

These data illustrate the improvements in filtration when an effective amount of a neutral salt, such as sodium chloride, is present. The increase of the solids content of the filter cake in Experiment G and especially Experiments H and I was significant.

EXAMPLE 2

By way of demonstrating the effect of the presence of a neutral salt in improving the filtration of dispersions of EVA copolymers, the following experiments were carried out with varying amounts of sodium sulfate.
1. Dispersions A series of EVA polymer dispersions were made in a laboratory batch pressure vessel (1-liter Parr Autoclave). Each dispersion was made from 450 g. deionized water, 150 g. Vynathene EY 901 pellets (an ethylene-vinyl acetate resin from U.S. Industrial Chemicals Co., division of National Distillers and Chemical Corporation, containing 39.25 percent vinyl acetate, and having a melt flow rate (MFR) as determined by ASTM D 1238-73 of 1.3 g/10 min.) and 15 g. of sodium stearate. The autoclave was heated to 200° C. accompanied by rapid stirring. After ten minutes, the autoclave contents were allowed to cool to just below 100° C. and were poured into a beaker. The dispersion was allowed to cool further and used in the experiments as described below. Where the dispersion was added to the let-down solution at an elevated temperature, e.g. 90° C., it was heated on a hot plate.

2. Let-Down Process

In the let-down process, the dispersion was rapidly added to a stirred aqueous solution of sodium sulfate in a 4-liter beaker containing enough (2 g.) of suspended calcium hydroxide to convert the sodium stearate dispersant to calcium stearate. This deposited calcium stearate on the surface of the EVA particles, and made it possible to recover them by filtration. Once the sodium stearate had been converted to calcium stearate, there was no longer a dispersing agent present, and what remained was referred to as the "product slurry."

Variables investigated include dilution ratio (let-down solution/dispersion), sodium sulfate concentration, and the temperatures of the dispersion and let-down solution at the moment they were mixed.

After the dispersion had all been added to the let-down solution, the temperature of the resulting product slurry was noted and stirring was continued for an additional 5 minutes. The temperature was again checked. These two temperatures provide an idea of what the temperature of the let-down process can be during continuous operation.

The product slurry was allowed to stand undisturbed for 10 minutes more, when the thickness of the solids layer (inches) and the relative amount of solids (volume % solids) were recorded. The product slurry was then filtered.

3. Filtration

Product slurries were vacuum filtered on Whatman 541 paper at 22 in Hg. on a Buchner funnel with an inside diameter of 6⅜inches. Product slurry temperature was recorded at the start of the filtration. When the conditions of the let-down process were satisfactory, filtrations were very rapid and clear filtrate were obtained. Cake thickness after 5 minutes of filtration was noted. Percent solids content of the filter cakes were determined by fusion. 4. Results The results of these experiments are presented in Table II.

a. Dispersions Reheated to 40°–55° C.

In Experiments 1, 2 and 3, the dispersion temperatures were 41, 40–41 and 55° C., respectively and the let-down solution was at room temperature (23°–25° C.). Mixing the dispersion rapidly with the let-down solution under these conditions gave product slurries with temperatures of 28°–33° C. Clean separation into a solid layer was observed. Filtration was rapid and the filtrate was clear. The filter cakes contained 52 to 56 percent solids. These three experiments, however, were preliminary in the sense that dispersion temperatures of 40°–55° C. can not be used in continuous operation because the dispersions become gel-like in nature and

TABLE II

COMPOSITION OF DISPERSIONS
Deionized Water - 450 g
Vynathene EY 901 - 150 g
Sodium Stearate - 15 g[1]

| Exp. No. | Dispersion Temperature upon Addition to Let-Down Solution, °C. | Let Down Solution[2] | | | | | Temp., °C. | Product Slurry[3] Temp., C. | |
|---|---|---|---|---|---|---|---|---|---|
| | | Water g. | Dilution Ratio | $Na_2SO_4$ g. | pph, on all water | $Ca(OH)_2$, g. | | Initial | After 5 Min. Stirring |
| 1 | 41 | 1200 | 2:1 | 77.5 | 4.7 | 2 | 23 | 30 | 28 |
| 2 | 40–41 | 1200 | 2:1 | 77.5 | 4.7 | 2 | 25 | 29 | 28 |
| 3 | 55 | 1200 | 2:1 | 77.5 | 4.7 | 2 | 24 | 33 | 32 |
| 4 | 90 | 1200 | 2:1 | 77.5 | 4.7 | 2 | 21–22 | 41 | 39 |
| 5 | 90 | 1200 | 2:1 | 77.5 | 4.7 | 2 | 23 | 43 | 41 |
| 6 | 90 | 1200 | 2:1 | 77.5 | 4.7 | 2 | 55 | 64–65 | 62 |
| 7 | 90 | 1200 | 2:1 | 16.5 | 1.0 | 2 | 23 | 42 | 40 |
| 8 | 90 | 1200 | 2:1 | 33 | 2.0 | 2 | 22 | 41 | 39–40 |
| 9 | 90 | 1200 | 2:1 | 49.5 | 3.0 | 2 | 24 | 42 | 39–40 |
| 10 | 90 | 600 | 1:1 | 49.4 | 4.7 | 2 | 20 | 50 | 45 |
| 11 | 90 | 600 | 1:1 | 49.4 | 4.7 | 2 | 23 | 50 | 45 |
| 12 | 90 | 600 | 1:1 | 86.1 | 8.2 | 2 | 21–2 | 50 | 43 |

| Exp. No. | Product Slurry[3] 10 Min. After Cessation of Stirring | | Filtration[4] | | | Remarks |
|---|---|---|---|---|---|---|
| | Volume % Solids | Thickness of Solids Layer (Inches) | Temp. at Start, °C. | Cake Thickness, after 5 min., inches | Weight % Solids in Cake | |
| 1 | 49 | 2.12 | — | — | 53.1 | Good |
| 2 | 52 | 2.19 | 27 | 0.81 | 51.9 | Good(repeat of Exp. 1) |
| 3 | 40 | 1.69 | 30 | 0.69 | 56.4 | Good |
| 4 | 32 | 1.37 | 37 | 0.62 | 59.1 | Good |
| 5 | 41 | 1.75 | 39 | 0.69 | 57.7 | Good(repeat of Exp. 4) |
| 6 | Poor Separation | — | — | — | — | Poor; blinding; cloudy filtrate |
| 7 | Poor Separation | | | | | Poor; blinding; cloudy filtrate |
| 8 | Poor Separation | | | | | Poor; blinding; cloudy filtrate |
| 9 | 43 | 1.87 | 40 | 0.75 | 56.2 | Good |
| 10 | 62 | 1.87 | 35 | 0.75 | 60.2 | Poor; cloudy filtrate |
| 11 | 52 | 1.62 | 43 | 0.69 | 61.9 | Fair; better than Exp. 10 |
| 12 | 48 | 1.50 | 40 | 0.69 | 57.8 | Good |

[1]Added to the autoclave as such (not formed in situ from stearic acid and NaOH).
[2]Contained the amount of $Na_2SO_4$ shown, dissolved, and the $Ca(OH)_2$ in suspension.
[3]Note that after the sodium stearate has been converted to calcium stearate by $Ca(OH)_2$, no dispersing agent is left and the product is simply a slurry of suspended (and calcium stearate - coated) EY 901 particles. The dispersion and let-down solution were contacted in a 4-liter beaker, stirred with a paddle stirrer.
[4]The filtrations were done in a Bucliner funnel (6⅜ in. i.d.).

DISCUSSION

A. Dilution Ratio of 2:1

The first nine experiments in Table II were done at a dilution ratio of about 2:1 (1200 g. diluent/615 g. dispersion). In the last three experiments, however, the dilution ratio was reduced to about 1:1. (600 g. diluent/615 g. dispersion).

In most of the experiments at a 2:1 dilution ratio, the sodium sulfate concentration based on total water was fixed at 4.7 pph, but in Experiments 7, 8 and 9, lower concentrations were evaluated.

1. Effect of Dispersion Reheated to 40°–55° C.

will not flow in pipes. In subsequent experiments, the dispersion temperature was fixed at 90° C., which is the range for continuous operation.

b. Dispersions Reheated to 90° C.

In duplicate Experiments 4 and 5, in which the dispersion at 90° C. was mixed with let-down solution at room temperature, the resulting product slurry temperature was 39°–41° C. (there was no insulation on the beaker). The product slurry again separated cleanly into a solid layer (on top) and a clear aqueous phase. Filtration was rapid and the filtrate was clear. Solids content of the filter cake was 58 to 59 percent, up a little from Experiments 1–3 (52 to 56 percent).

These results suggest that the let-down tank, could be run as high as 40° C. about. However, a lower temperature can have no deleterious effect except perhaps to drop the solids content of the filter cake a little.

In Experiment 6, the let-down solution itself was heated to 55° C. before mixing with the dispersion reheated to 90° C. Now the product slurry temperature was 64°–65° instead of 40° C. At this higher temperature, the product slurry did not separate cleanly into the desired solid layer and a clear aqueous layer, but remained as a cloudy suspension. These cloudy suspensions blind the filter and must avoided. A product slurry temperature of 64°–65° C. is decidedly too high for effective filtering.

2. Reduction of Na₂SO₄ Concentration

At a 2:1 dilution ratio and a product slurry temperature of 40° C. or lower, good filtrations were obtained at a 4.7 pph concentration of sodium sulfate, based on total water.

In Experiments 7, 8 and 9, the sodium sulfate concentration was lowered to 1, 2 and 3 pph, all other conditions being the same. Here it was found that at 1 and 2 pph of sodium sulfate (Experiments 7 and 8, respectively), the product slurry was cloudy and failed to separate cleanly into a solids layer and a clear aqueous layer. Filtration was poor, the filter paper blinded and the filtrate was cloudy. At the 3 pph of sodium sulfate (Experiment 9), however, separation was clean and the filtration was good.

From this evidence, it appears that the minimum sodium sulfate concentration under the stated conditions is around 3 pph.

B. Dilution Ratio of 1:1

The final three experiments in Table II were done at a dilution rate of about 1:1 (600 g. let-down solution/615 dispersion). At the 4.7 pph concentration of Na₂SO₄ found best for the 2:1 dilution ratio, above, it is seen that filtration results are now marginal; i.e., Experiment 10 gave poor results while the duplicate Experiment 11 gave better, but still not good, results. Product slurry temperature at 1:1 dilution was higher (50° C.) than for 2:1 dilution (40° C.).

Experiment 12, however, in which the sulfate concentration was increased to 8.2 pph, was successful.

C. Particle Size

The particle size distribution of EVA powders prepared by the process of this invention was compared to that of several EVA powders prepared by substantially the same process as employed herein except for the presence of a neutral salt in the dispersion medium or the let-down solution. Table III presents this screen analysis of powder products made at product slurry temperature of 28°–30° C. (Experiment 1) and 39°–41° C. (Experiment 4) with those where the product slurry was 23° C. and no neutral salt was present. The differences do not appear very significant.

TABLE III

Particle Size Distribution of Vynathene EY 901 Powder with and without Sodium Sulfate in Let-Down

| Exp. No. | Na₂SO₄, pph | Weight % of Particles Having a Diameter in Microns of | | | | |
|---|---|---|---|---|---|---|
| | | <106 | 106–149 | 149–250 | 250–420 | >420 |
| 1 | 4.7 | 87.0 | 8.4 | 3.8 | 0.4 | 0.4 |
| 4 | 4.7 | 81.9 | 10.0 | 6.4 | 0.8 | 0.8 |
| 13[1] | None | 74.1 | 10.3 | 12.5 | 2.8 | 0.3 |
| 14[2] | None | 76.7 | 10.6 | 9.6 | 2.3 | 0.5 |

Notes:
[1] Vynathene EY 901 (40.41% VA, MFR: 1.486 g/10 min.)
[2] Vynathene EY 901 (43.2% VA, MFR: 1.144 g/10 min.)

Obviously, other modifications and variations of the present invention are possible in light of the above teachings. It is therefore to be understood that changes may be made in the particular embodiments of this invention which are within the full intended scope of the invention as defined by the appended claims.

What is claimed is:

1. In a process for improving the parting characteristic of particulate ethylene-vinyl acetate polymers comprising from about 25 percent to about 85 percent vinyl acetate units and corresponding hydrolyzed ethylene-vinyl acetate polymers which comprises agitating, in the molten state, said polymer in an aqueous dispersion system comprising an alkali metal soap and cooling the resulting dispersion to obtain said polymer as finely divided particles; converting said soap in situ to the corresponding carboxylic acid or to the corresponding alkaline earth metal soap to coat said particles; and recovering said particles by filtration and drying, the improvement which comprises:

adding, subsequent to the formation of the polymer dispersion and prior to the filtration thereof, about 3% to about 5% by weight, based on the total water weight, of a water-soluble, substantially neutral salt inert to said soap whereby the filtration time is substantially reduced, the solids content of the filter cake is substantially increased and the drying time of the filter cake is substantially reduced compared to the time required in the absence of said neutral salt.

2. A process according to claim 1 wherein the substantially neutral salt is sodium sulfate.

3. A process according to claim 1 wherein the substantially neutral salt is sodium chloride.

4. A process according to claim 1 wherein said dispersion system comprises an alkali metal soap of a saturated fatty acid of from about 8 to about 22 carbon atoms.

5. A process according to claim 4 wherein said soap comprises an alkali metal stearate.

6. A process according to claim 5 wherein said soap comprises sodium stearate.

7. A process according to claim 1 wherein said converting is effected by the addition of a source of alkaline earth metal ions to said dispersions.

8. A process according to claim 7 wherein said source is calcium oxide or calcium hydroxide.

9. A process according to claim 1 wherein said converting is effected by the addition of acid to convert said soap to the corresponding carboxylic acid.

10. In a process for improving the parting characteristics of particulate saponified ethylene-vinyl acetate polymers which comprises agitating, in the molten state, ethylene-vinyl acetate polymers comprising from about 25 percent to about 85 percent vinyl acetate units in an aqueous dispersion system comprising alkali metal soap together with an alkali metal hydroxide in an amount sufficient to saponify said polymer to a predetermined degree, cooling the resulting dispersion to obtain said polymer as finely divided particles, converting said soap in situ to the corresponding carboxylic acid or to the corresponding alkaline earth metal soap to coat said particles and recovering said particles by filtration and drying, the improvement which comprises:

adding, subsequent to the formation of the dispersion of polymer and prior to the filtration thereof, about 3% to about 5% by weight, based on the total water weight, of a water-soluble, substantially neutral salt inert to said soap whereby the filtration time is substantially reduced, the solids content of the filter cake is substantially increased and the drying time of the filter cake is substantially reduced compared to the time required in the absence of said neutral salt.

11. A process according to claim 10 wherein the substantially neutral salt is sodium chloride.

12. A process according to claim 10 wherein the substantially neutral salt is sodium sulfate.

13. A process according to claim 10 wherein said alkali metal soap is a soap of a saturated fatty acid of from about 8 to about 22 carbon atoms.

14. A process according to claim 13 said soap is sodium stearate.

15. A process according to claim 10 wherein said alkali metal hydroxide is sodium hydroxide.

16. A process according to claim 10 wherein said converting is effected by the addition of a source of alkaline earth metal ions to said dispersion.

17. A process according to claim 16 wherein said source is calcium oxide or calcium hydroxide.

18. A process according to claim 10 wherein said converting is effected by the addition of acid to convert said soap to the corresponding carboxylic acid.

19. A particulate polymer prepared by the method of claim 1.

20. A particulate polymer prepared by the method of claim 10.

* * * * *